3,138,597
PHENYLPIPERAZINYLALKYL CARBAMATES
Robert N. Schut, Edwardsburg, Mich., assignor to Miles Laboratories, Inc., Elkhart, Ind., a corporation of Indiana
No Drawing. Filed May 26, 1961, Ser. No. 112,774
15 Claims. (Cl. 260—268)

This invention relates to novel carbamates of the phenyl piperazine series and to methods for their synthesis.

The novel carbamates of this invention may be represented in their free base form by means of the formula—

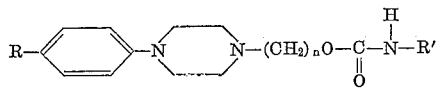

wherein R represents hydrogen or lower alkyl, $n$ represents an integer from 2 to 5 and R' represents mono-lower alkoxy substituted phenyl, di-lower alkoxy substituted phenyl, tri-lower alkoxy substituted phenyl or methylenedioxy phenyl. R' may also represent the various mentioned substitutions on a benzyl radical.

These compounds may exist as various salts in addition to the free bases.

Without limiting the choice of salts which may be prepared, there may be mentioned as illustrative of these salts the hydrochlorides, oxalates, maleates, methiodides and methosulfates. The various salts may be formed depending upon the method of preparation of the carbamates or whichever salt of the carbamate is prepared may be readily converted to various other salts by reaction with the appropriate acid.

The compounds of this invention may be prepared by reacting an appropriate 4-phenyl-1-piperazine-alkanol with an isocyanate or an acid azide in order to give the corresponding carbamate derivative. The preparative scheme may be illustrated by means of the following equation:

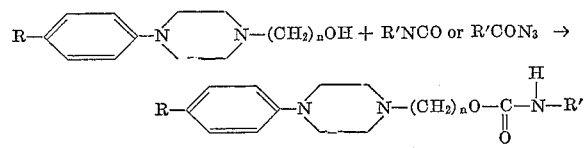

from which it can be seen that the radical substituting the nitrogen of the carbamate radical is contributed by an isocyanate or azide used in the reaction. The reaction of the phenyl piperazine alkanol with the isocyanate or azide may be conveniently carried out in a suitable inert solvent medium by heating the reactants under reflux. The product isolated is the free base form from which any of the desired salts mentioned above may be prepared by neutralization. Suitable solvents for carrying out the reaction include benzene, toluene, xylene and other materials of like nature which will not interfere in reaction between the phenyl piperazine alkanol and the isocyanate or azide.

The compounds of this invention have useful sedative properties.

The invention will be better understood by reference to the following examples which are included for the purposes of illustration and are not to be construed as unduly limiting the scope of this invention which should be determined in accordance with the claims appended hereto.

EXAMPLE I

4-Phenyl-1-[2-(p-Methoxyphenylcarbamoyloxy)
Ethyl]Piperazine (A) *p-Methoxyphenyl isocyanate.*—This compound was prepared according to the method of R. L. Shriner, W. H. Horne and R. F. B. Cox, "Organic Syntheses," coll. vol. II, 453 (1948). The crude product was distilled through a short-path column to give a colorless liquid in 73% yield, B.P. 63–65° C. (0.7 mm.), $n_D^{26}$ 1.544.

(B) *4 - phenyl-1-[2-(p - methoxyphenylcarbamoyloxy) ethyl]piperazine.*—A mixture of 20.6 g. (0.10 mole) of 1-(2-hydroxyethyl)-4-phenylpiperazine and 14.9 g. (0.10 mole) of p-methoxyphenyl isocyanate in 150 ml. of dry benzene was heated under reflux for 6 hours. The benzene solution was cooled and an equal volume of ether was added. The crystalline precipitate was collected, washed with ether and dried to give 26.0 g. (73%) of product, M.P. 120–122° C.

A solution of the free base in methanol was treated with an excess of hydrogen chloride in methanol. The product was filtered and washed with methanol, M.P. 212.5–213° C. (dec.).

*Analysis.*—Calcd. for $C_{20}H_{27}Cl_2N_3O_3$: Cl, 16.59. Found: Cl, 16.50.

EXAMPLE II

4-Phenyl-1-[2-(N-Piperonylcarbamoyloxy)Ethyl]
Piperazine (A) *Piperonyl isocyanate.*—The procedure W. Siefken, Ann. 562, 101 (1949), was employed for this preparation. Phosgene gas was bubbled into a suspension of 107 g. (0.57 mole) of piperonylamine hydrochloride (M.P. 242–243° C.) and 600 ml. of chlorobenzene at reflux temperature. The gas was bubbled through peanut oil at the beginning of the system and absorbed in 50% sodium hydroxide solution at the end. After 3 hours the solid material was completely dissolved. A slow stream of gas was bubbled through the system for 15 minutes and then the chlorobenzene was distilled (15 mm.). The residual liquid was distilled in vacuo to give 91.5 g. (91%) of product, B.P. 96–97° C. (0.4 mm.) $n_D^{26}$ 1.549.

(B) *4-phenyl-1-[2-(N - piperonylcarbamoyloxy)ethyl] piperazine.*—This compound was prepared according to the procedure of Example I(B) using 1-(2-hydroxyethyl)-4-phenylpiperazine and piperonyl isocyanate. The free base was obtained in 73% yield, M.P. 101.5–102° C.

An excess of maleic acid in ether was added to a methanol-ether solution of the free carbamate. The product was recrystallized from methanol-ether, M.P. 108–109° C.

*Analysis.*—Calcd. for $C_{25}H_{29}N_3O_8$: N, 8.42. Found: N, 8.59.

EXAMPLE III 4-p-Tolyl-1-[3-(p-Methoxyphenylcarbamoyloxy)
Propyl]Piperazine

This compound was prepared according to the procedure described in Example I, using p-methoxyphenyl isocyanate and 4-p-tolyl-1-(3-hydroxypropyl)piperazine. The free base was obtained in 48% yield, M.P. 85–87° C., maleate, M.P. 149.5–150.5° C.

*Analysis.*—Calcd. for $C_{26}H_{33}N_3O_7$: N, 8.41. Found: N. 8.38.

EXAMPLE IV

4-Phenyl-1[3-(N-Piperonylcarbamoyloxy)
Propyl]Piperazine

The carbamate was prepared from piperonyl isocyanate and 4-phenyl-1-(3-hydroxypropyl)piperazine according to Example I. The free base was obtained in 76% yield, M.P. 86–87° C., dihydrochloride, M.P. 188–189° C. (dec.).

*Analysis.*—Calcd. for $C_{22}H_{29}Cl_2N_3O_4$: Cl, 15.11. Found: Cl, 14.85.

EXAMPLE V

*4-Phenyl-1-[4-(N-Piperonylcarbamoyloxy)Butyl] Piperazine*

This compound was prepared according to Example I from piperonyl isocyanate and 4-phenyl-1-(4-hydroxybutyl)piperazine. The free base was isolated as a syrup and was converted to the dihydrochloride in 60% yield, M.P. 194–194.5° C. (dec.).

*Analysis.*—Calcd. for $C_{23}H_{31}Cl_2N_3O_4$: HCl, 15.08. Found: HCl, 14.89.

EXAMPLE VI

*4-Phenyl-1-[5-(N-Piperonylcarbamoyloxy)Pentyl] Piperazine*

This compound was prepared as described above from piperonyl isocyanate and 4-phenyl-1-(5-hydroxypentyl) piperazine. The free base was not isolated, but was converted to the dihydrochloride in 50% yield, M.P. 178–178.5° C. (dec.).

*Analysis.*—Calcd. for $C_{24}H_{33}Cl_2N_3O_4$: HCl, 14.66. Found: HCl, 14.62.

EXAMPLE VII

*4-Phenyl-1-[5-(p-Methoxyphenylcarbamoyloxy)Pentyl] Piperazine*

This carbamate was prepared from p-methoxyphenyl isocyanate and 4-phenyl-1-(5-hydroxypentyl)piperazine according to the procedure of Example I. The free base, M.P. 116–116.5° C., was converted to the maleate, M.P. 175–176.5 ° C. (dec.).

*Analysis.*—Calcd. for $C_{27}H_{35}N_3O_7$: N, 8.19. Found: N, 8.08.

EXAMPLE VIII

*4-Phenyl-1-[2-(3,4,5-Trimethoxyphenylcarbamoyloxy) Ethyl]Piperazine*

(A) *3,4,5-trimethoxybenzoyl azide.*—To a stirred solution of 57.8 g. (0.25 mole) of 3,4,5-trimethoxybenzoyl chloride in 300 ml. of acetone at 10° C. was added a solution of 20 g. (0.31 mole) of sodium azide in 100 ml. of water over a 45-minute period. The mixture was allowed to warm to room temperature, then diluted with 1 liter of water to ensure maximum precipitation of the azide. The white solid was filtered, washed with water and dried to give 58.0 g. (98%) of product, M.P. 85.5–86.5° C. (evolution of gas at the melting point).

(B) *4-phenyl-1-[2-(3,4,5-trimethoxyphenylcarbamoyloxy)ethyl]piperazine.*—To a solution of 2.37 g. (0.010 mole) of 3,4,5-trimethoxybenzoyl azide in 30 ml. of dry benzene was added 2.06 g. (0.010 mole) of 4-phenyl-1-(2-hydroxyethyl)piperazine. The mixture was heated under reflux for 5 hours. A small amount of insoluble impurity was filtered and the filtrate was concentrated in vacuo to give a white solid. The material was triturated with ether, filtered and dried to yield 3.81 g. (92%) of carbamate, M.P. 124–125° C. Recrystallization from benzene-ether produced the analytical sample, M.P. 124.5–125.5° C.

*Analysis.*—Calcd. for $C_{22}H_{29}N_3O_5$: N (basic), 3.37. Found: N, 3.29 (titration).

A solution of the free base in methanol-ether was treated with a two-fold excess of oxalic acid in methanol. The oxalate was recrystallized from methanol-ether, M.P. 155–156° C.

*Analysis.*—Calcd. for $C_{24}H_{31}N_3O_9$: N, 8.32. Found: N, 8.24.

EXAMPLE IX

*4-Phenyl-1-[4-(3,4,5-Trimethoxyphenylcarbamoyloxy) Butyl]Piperazine*

This carbamate was prepared by the method outlined above from 3,4,5-trimethoxybenzoyl azide and 4-phenyl-1-(4-hydroxybutyl)piperazine. The free base was isolated as a viscous oil in 78% yield. This material was converted to the crystalline maleate in 88% yield, M.P. 152.5–154° C.

*Analysis.*—Calcd. for $C_{28}H_{37}N_3O_9$: N, 7.51. Found: N, 7.58.

EXAMPLE X

*4-Phenyl-1-[2-(3,4-Methylenedioxyphenylcarbamoyloxy) Ethyl]Piperazine*

This carbamate was prepared from 3,4-methylenedioxybenzoyl azide and 4-phenyl-1-(2-hydroxyethyl)piperazine according to the procedure given in Example VIII. The free base was obtained in 75% yield, M.P. 118.5–119.5° C., maleate, M.P. 151–153° C.

*Analysis.*—Calcd. for $C_{24}H_{27}N_3O_8$: N, 8.66. Found: N, 8.72.

EXAMPLE XI

*4-Phenyl-1-[4-(3,4-Methylenedioxyphenylcarbamoyloxy) Butyl]Piperazine*

This compound was prepared from 3,4-methylenedioxybenzoyl azide and 4-phenyl-1-(4-hydroxybutyl)piperazine. The free base was obtained in 66% yield, M.P. 95.5–97° C., maleate, M.P. 157–159° C.

*Analysis.*—Calcd. for $C_{26}H_{31}N_3O_8$: N, 8.19. Found: N, 8.21.

EXAMPLE XII

*4-Phenyl-1-[2-(3,4-Dimethoxyphenylcarbamoyloxy) Ethyl]Piperazine*

This compound was prepared from 3,4-dimethoxybenzoyl azide and 4-phenyl-1-(2-hydroxyethyl)piperazine by the procedure outlined in Example VIII. The free base was obtained as a syrup and was converted directly to the maletate in 76% yield, M.P. 144.5–145.5° C.

*Analysis.*—Calcd. for $C_{25}H_{31}N_3O_8$: N, 8.38. Found: N, 8.44.

EXAMPLE XIII

*4-Phenyl-1-[3-(3,4,5-Trimethoxyphenylcarbamoyloxy) Propyl]Piperazine*

This carbamate was prepared according to the procedure of Example VIII, using 3,4,5-trimethoxybenzoyl azide and 4-phenyl-1-(3-hydroxypropyl)piperazine. The free base was obtained in 88% yield, M.P. 95.5–98° C., maleate, M.P. 163–164° C. (dec.).

*Analysis.*—Calcd. for $C_{27}H_{35}N_3O_9$: N, 7.70. Found: N, 7.86.

EXAMPLE XIV

*4-Phenyl-1-[5-(3,4,5-Trimethoxyphenylcarbamoyloxy) Pentyl]Piperazine*

This compound was prepared from 3,4,5-trimethoxybenzoyl azide and 4-phenyl-1-(5-hydroxypentyl)piperazine. The product was isolated as the maleate in 97% yield, M.P. 132–133° C.

*Analysis.*—Calcd. for $C_{29}H_{39}N_3O_9$: N, 7.33. Found: N, 7.38.

In summary, this invention provides a class of novel phenyl piperazinyl alkyl carbamates defined in accordance with the structural formula given above. These compounds have useful sedative properties.

What is claimed is:

1. A compound selected from the group consisting of phenylpiperazinylalkyl carbamates of the formula—

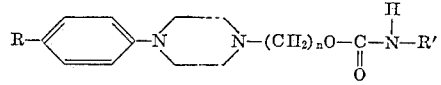

wherein R is a member selected from the group consisting of hydrogen and lower alkyl, $n$ is an integer from 2 to 5 and R' is a member selected from the group consisting of mono-lower alkoxy substituted phenyl, mono-lower alkoxy substituted benzyl, di-lower alkoxy substituted phenyl, di-lower alkoxy substituted benzyl, tri-lower alkoxy substituted phenyl, tri-lower alkoxy substituted benzyl, methylenedioxy substituted phenyl, methylenedioxy substituted benzyl and non-toxic acid addition salts thereof.

2. 4-phenyl - 1 - [2-(p - methoxyphenylcarbamoyloxy)ethyl]piperazine.
3. 4-phenyl - 1 - [2-(N-piperonylcarbamoyloxy)ethyl]piperazine.
4. 4-p-tolyl - 1 - [3-(p-methoxyphenylcarbamoyloxy)propyl]piperazine.
5. 4 - phenyl - 1 - [3 - (N - piperonylcarbamoyloxy)propyl]piperazine.
6. 4-phenyl - 1 - [4-(N-piperonylcarbamoyloxy)butyl]piperazine.
7. 4 - phenyl - 1 - [5 - (N - piperonylcarbamoyloxy)pentyl]piperazine.
8. 4-phenyl - 1 - [5-(p-methoxyphenylcarbamoyloxy)pentyl]piperazine.
9. 4-phenyl - 1 - [2-(3,4,5-trimethoxyphenylcarbamoyloxy)ethyl]piperazine.
10. 4-phenyl - 1 - [4-(3,4,5-trimethoxyphenylcarbamoyloxy)butyl]piperazine.
11. 4-phenyl - 1 - [2-(3,4-methylenedioxyphenylcarbamoyloxy)ethyl]piperazine.
12. 4-phenyl - 1 - [4-(3,4-methylenedioxyphenylcarbamoyloxy)butyl]piperazine.
13. 4-phenyl - 1 - [2-(3,4-dimethoxyphenylcarbamoyloxy)ethyl]piperazine.
14. 4-phenyl - 1 - [3-(3,4,5-trimethoxyphenylcarbamoyloxy)propyl]piperazine.
15. 4-phenyl - 1 - [5-(3,4,5-trimethoxyphenylcarbamoyloxy)pentyl]piperazine.

References Cited in the file of this patent
UNITED STATES PATENTS
2,836,595   Parcell ---------------- May 27, 1958

OTHER REFERENCES
Karrer: Organic Chemistry, page 125, 2nd edition, Elsevier Publ. Company, Inc., New York (1946).